United States Patent [19]

Müeller et al.

[11] 4,309,765
[45] Jan. 5, 1982

[54] PROCESS FOR TRANSMITTING ITEMS OF INFORMATION BETWEEN DEVICES OF AN INDIRECTLY CONTROLLED EXCHANGE SYSTEM, IN PARTICULAR A TELEPHONE EXCHANGE SYSTEM

[75] Inventors: Helmut Müeller, Planegg; Hans P. von Ow, Munich; Thomas Rambold, Munich; Bernhard Werres, Munich, all of Fed. Rep. of Germany

[73] Assignee: Siemens Aktiengesellschaft, Berlin & Munich, Fed. Rep. of Germany

[21] Appl. No.: 90,294

[22] Filed: Nov. 1, 1979

[30] Foreign Application Priority Data

Nov. 14, 1978 [DE] Fed. Rep. of Germany ....... 2849371

[51] Int. Cl.³ .......................... H04J 3/02; H04Q 11/04
[52] U.S. Cl. ......................................... 370/99; 370/58
[58] Field of Search .................. 370/99, 58, 119, 118; 364/200; 179/18 J

[56] References Cited

U.S. PATENT DOCUMENTS

| 3,570,008 | 3/1971 | Downing et al. ................ 364/200 |
| 3,740,482 | 6/1973 | Plank et al. ..................... 370/118 |
| 4,016,548 | 4/1977 | Law et al. ........................ 370/99 |
| 4,110,830 | 8/1978 | Krygowski ....................... 364/200 |

FOREIGN PATENT DOCUMENTS

| 1213008 | 9/1966 | Fed. Rep. of Germany . |
| 2305094 | 8/1974 | Fed. Rep. of Germany ...... 370/118 |
| 1049160 | 10/1975 | United Kingdom . |

*Primary Examiner*—Douglas W. Olms
*Attorney, Agent, or Firm*—Hill, Van Santen, Steadman, Chiara & Simpson

[57] ABSTRACT

In a process for transmitting items of information between devices of an indirectly controlled exchange system via time division multiplex (TDM) channels, with multiple repetition of the items of information, the items of information comprise a plurality of bytes including a number byte which numbers the relevant item of information. The items of information are transmitted by means of buffer stores and multiplexers. The item of information also include a acknowledgment bytes which acknowledge the correct reception of previously transmitted items of information. The reception of acknowledgement bytes is also evaluated as a signal that the TDM channel previously used to transmit the acknowledged information has been released for the transmission of a further item of information.

9 Claims, 2 Drawing Figures

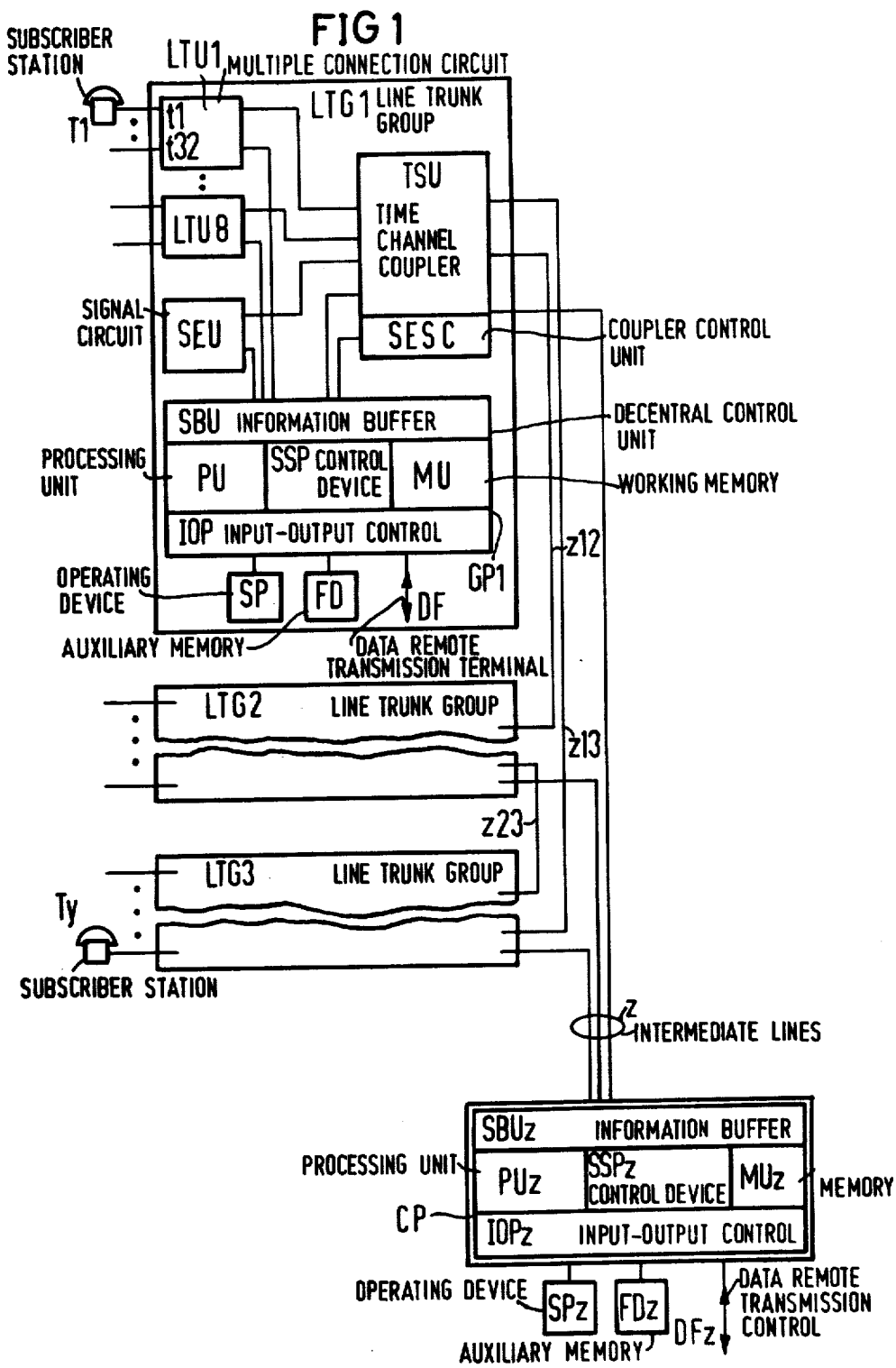

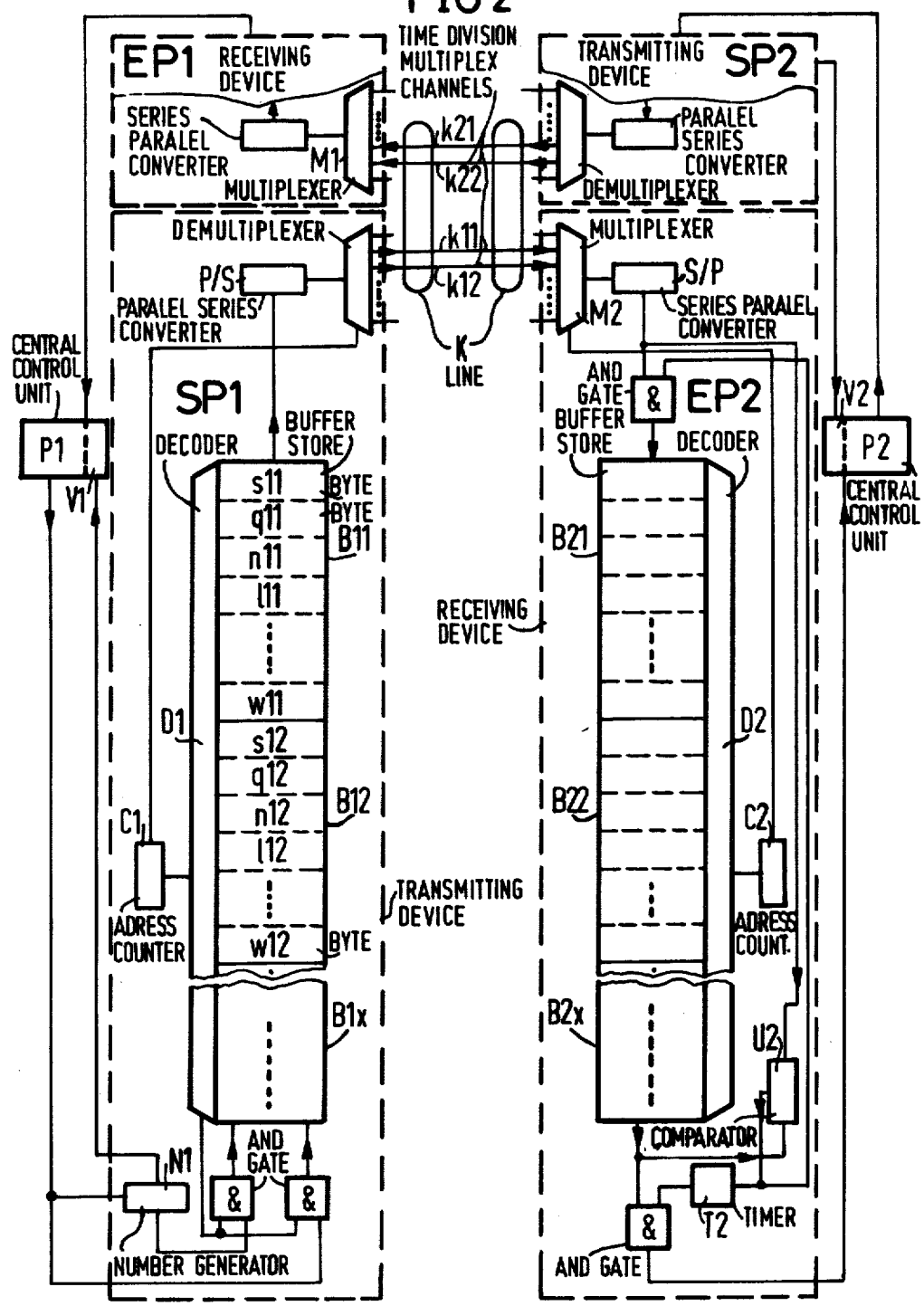

PROCESS FOR TRANSMITTING ITEMS OF INFORMATION BETWEEN DEVICES OF AN INDIRECTLY CONTROLLED EXCHANGE SYSTEM, IN PARTICULAR A TELEPHONE EXCHANGE SYSTEM

BACKGROUND OF THE INVENTION

1. Field of the Invention

The present invention relates to a process for transmitting items of information between devices of an indirectly controlled exchange system, and is more particularly concerned with the transmission of information between devices of an indirectly controlled telephone exchange system.

2. Description of the Prior Art

It is well known in the art to detect alterations in the operating state of associated devices in exchange systems in order to be able to perform allied switching procedures. This involves the use, for example, of items of interrogation information which are then compared with earlier items of interrogation information emanating from the same device, for analysis purposes. In dependence upon the comparison results, operating procedures are carried out in the exchange system (see German published application Nos. 14 37 576 and 23 17 400; German Pat. No. 12 13 008; and German patent application No. P 27 44 118). In exchange systems of this kind, the interrogation of the device is directly linked to the analysis of the interrogation information which is obtained, and therefore between the interrogation of two different devices the comparison of second items of interrogation information of the same device is carried out, which may possibly be followed by the storage of the address of a device in respect of which the operating state has changed, which has resulted from modified interrogation information (see German Pat. No. 12 13 008). Also known in the art is the possibility of interrupting the interrogation process in order to perform the required operating processes which result from the obtained interrogation information (see the German allowed application No. 14 37 576, Page 74).

In this known technology it is provided that further processing on the basis of items of interrogation information in the control unit be carried out only when it is a question of modified information. Technology of this kind has already been proposed for an indirectly controlled exchange system which comprises a control unit for which items of information emanating from a plurality of other devices are regularly recorded at specific intervals of time for further processing, for which purpose the items of information are first stored, whereupon consecutive items of information emanating from the same device are compared with one another before items of information are further processed by the control unit on the basis of information modifications (see German patent application No. P 28 34 938). This can also take place in a telephone exchange system which is equipped with time channel couplers and wherein items of communication to be exchanged between subscribers are transmitted in pulse code modulation (PCM) operation by way of time division multiplex (TDM) channels.

However, it is also possible in an exchange system of this kind that items of information which are identical in content may have to be transmitted at longer or shorter intervals of time, where, in spite of their conformity, each of these items of information which are to be transmitted must trigger a processing procedure. These items of information can consist, for example, of test commands which are transmitted from a central control device to a peripheral device. If test commands of this kind are transmitted, for example, at a time of day at which very low traffic prevails, it is likely that, in spite of a certain interval of time between such test commands, they will not be altered by other items of information to be transmitted. The later test command which conforms in content with the previous, is, however, to initiate the commanded test. Test commands of this kind must be transmitted, for example, from a central control device to a peripheral device in the exchange system. The information can also consist for example, of items of dialled information which are identical in content, since they relate to two dialled digits, which are dialled consecutively by a subscriber and which are identical. Items of dialled information of this kind must be transmitted, for example, from peripheral devices to a central control device. In this case, each digit transmitted as a result of an item of dialled information must be analyzed as a separate dialled digit in the control device.

SUMMARY OF THE INVENTION

Therefore, the object of the present invention is to provide a process wherein items of information are transmitted across time division multiplex channels with multiple repetition, although new items of information need only be recorded once by the receiving device and wherein, nevertheless, items of information which are identical in content can be transmitted directly consecutively without suppressing the analysis of these items of information.

Therefore, the invention relates to a process for transmitting items of information between devices in an indirectly controlled exchange system across time division multiplex channels with multiple repetition of the information. The process can be used, in particular, in a telephone exchange system which is equipped with time channel couplers. A particular feature of the process, according to the present invention, is that in the transmitting device the items of information which are to be transmitted and which each consist of a plurality of bytes are, with the addition of a number byte which is supplied by an information counter and which numbers the relevant item of information, first of all input byte-wise into storage cells of a buffer store which forwards the items of information byte-wise in a regular cyclic operation, that new items of information are input at arbitrary intervals, and that in the receiving device the bytes related to new items of information are first recorded by an appropriate buffer store from where new items of information are not supplied for further processing until the complete end of a full recording cycle.

Due to the fact that the items of information to be transmitted are supplemented by number bytes, consecutively supplied items of information which are identical in content can be differentiated in that they are recorded in the receiving device as new information and can also be further processed therein. As the new items of information are input at arbitrary intervals in the transmitting device, no separate intermediate memory is required in which such items of information would otherwise have to be stored until a suitable time for reception in the buffer store. Therefore, the process corresponding to the invention advantageously realizes the above object. Since the buffer store which is assigned to the receiving device does not supply new items of information for further processing until the end of a full recording cycle, it is ensured that when such items are supplied they comprise all the related bytes. The ending of a full recording cycle can be ascertained, for example, by means of a timer which blocks the supply until this occurs.

In the receiving device, for example, a byte, having arrived, is compared by means of a comparator with the corresponding byte already contained in the buffer store, and only in the event of a deviation between these two bytes is the byte which has arrived transferred into the buffer store in place of the byte with which it has been compared (see German patent application No. 28 34 938). Then, the bytes related to the new items of information are recorded only once by the buffer store. If the system is equipped in such a manner that items of information recorded by the buffer store cannot be supplied until the comparison has been repeated, this ensures that a full recording cycle has been completed before the supply takes place.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram illustration of the structure of a telephone exchange system having time channel couplers; and FIG. 2 illustrates a circuit arrangement with the devices required for the execution of the process according to the present invention.

DESCRIPTION OF THE PREFERRED EMBODIMENTS

A telephone exchange system is illustrated in FIG. 1 as comprising a plurality of components LTG1, LTG2 and LTG3 which are connected, on one hand, to a plurality of subscriber stations T1-Ty and, on the other hand, via control lines z, to the central control unit CP. The various system components are also connected to one another by way of intermediate lines z12, z13 and z23. Each system component possesses its own decentral control unit. Therefore, the system component LTG1 comprises the decentral control unit GP1. This system component also comprises a time channel coupler TSU which is equipped with a coupler control unit SESC. The coupler control unit SESC receives setting up commands from the decentral control unit GP1. In the system component LTG1, the subscriber station T1 is connected via the subscriber connection circuits t1 to the time channel coupler TSU. Here, the subscriber connection circuits are combined in groups to form multiple connection circuits. Therefore, the subscriber connection circuits LTU1 have been combined. In this system component LTG1, a plurality of multiple connection circuits are provided, including the multiple connection circuit LTU8. Corresponding multiple connection circuits can also be provided, where several connection line connection circuits which are connected to connection lines leading, for example, to the other exchange systems, are combined. The time channel coupler TSU is also connected to a signal circuit SEU which comprises a sound generator, ringing generator, code transmitter and code receiver. Accordingly, this signal circuit can supply the various audible tones and ringing signals, and other required code signals. It is also able to receive such signals for analysis. The subscriber connection circuit t1-t32 and the others, and the signal circuit SEU are connected to the control unit GP1 and to the time channel coupler TSU. Therefore, these devices can be connected to one another as required via the time channel coupler TSU.

In addition these devices can exchange items of control information with the control unit GP1 and, in fact, via the associated information buffer SPU, which avoids a disturbing bottleneck. This control unit also comprises a control device SSP, a processing unit PU, a working memory MU, and an input/output control unit IOP which is further connected to an auxiliary memory FD and an operating device SP. A data remote transmission terminal DF is also arranged at this point by way of which items of control data can be exchanged with other exchanges. The system components LTG1, LTG2 and LTG3 illustrated in FIG. 1 are connected in all combinations via the intermediate lines z12, z13 and z23 across which the time channels extend. In addition, the associated decentral control units, such as the control unit GP1, are connected to a correspondingly constructed central control unit CP.

The central control unit cooperates in the establishment and release of connection paths which extend across at least two of the system components LTG1, LTG2 and LTG3. The central control unit CP ensures that the other control units are used correctly for the establishment and release of connection paths for which purpose items of control information are exchanged between these control units. The central control unit CP comprises an information buffer $SBU_z$, a control device $SSP_z$, a processing unit $PU_z$, a memory $MU_z$, and an input/output control $IOP_z$ which is also connected to an auxiliary memory $FD_z$ and an operating device $SP_z$.

A data remote transmission terminal $DF_z$ is also arranged at this point. The decentral control units, such as the control unit GP1, always handle those switching functions which occur in respect of every connection request and which are subject to urgency. These include the interrogation of subscriber circuits, the processing of items of switching information supplied in particular by subscriber circuits or via connection lines, charge metering in which case for example charge pulses are counted, and the supply of setting up commands for the coupler control unit. In contrast, the central control unit CP handles switching functions which must take into account the relationship between the sub-devices of the system and the relationship of the latter with other systems. These include the evaluation of dialled digits of subscriber numbers, the search for switching network outputs which can be used, and the search for and selection of connection paths and routing.

FIG. 2 illustrates a portion of the exchange system shown in FIG. 1. This portion takes into account those circuit components of the system which enable discussion of the process of the present invention. Accordingly, a line K is illustrated across which a plurality of time division multiplex channels extend including the time division multiplex channels k11 and k12 which extend from a transmitting device SP1 to a receiving device EP2. These channels also include the time division multiplex channel k21 and k22 which extend from a transmitting device SP2 to a receiving device EP1. The two devices SP1 and EP1 are assigned to one and the same information buffer, and similarly the devices EP2 and SP2 are assigned to the same other information buffer. Therefore, these two information buffers are connected via the line K. The information buffer which comprises the devices EP1 and SP1 is connected to a central control unit P1 which includes a comparator V1. The information buffer comprising the devices EP2 and SP2 is connected to a control unit P2 which includes a comparator V2. The control units consist of the central or decentral control unit in the exchange system illustrated in FIG. 1. When the line K which connects the aforementioned control units is operated in a TDM process, multiplexers are used which belong to the transmitting and receiving devices and which are connected to the line K. Therefore, in the case of the transmitting device SP1, the line K is connected to a multiplexer M1, while in the case of the receiving device EP2, the line K is connected to a multiplexer M2. Items of information incoming in a specific number from the TDM channels are converted by the multiplexer M2 of the receiving device EP2 in such a manner that they are forwarded via a single TDM channel. They then pass to a series/parallel converter S/P. The plurality of bits which form one byte arrive at the series/parallel converter SP in serial form and are forwarded by the converter in parallel to a buffer store B21–B2x. From the buffer store of the transmitting device SP1, corresponding bytes are fed first to the parallel/series converter P/S which then forwards the associated bits in serial form to the multiplexer M1. The multiplexer M1 converts the items of information incoming on one single TDM channel in such a manner that they are distributed between a plurality of TDM channels. FIG. 2 also indicates that the TDM channels of other lines also lead to other multiplexers (not shown). The items of information which are organized in the form of bytes are forwarded by all of these multiplexers byte-wise.

The bytes which form an item of information are collected in a storage position in the buffer store B11–B1x of the transmitting device SP1. These include the storage positions B11, B12 . . . B1x. First of all, the storage position B11 contains a synchronization byte s11, an acknowledgement byte q11, a numbering byte n11, a length byte l11, and a plurality of bytes which have not been labeled and which indicate the other contents of the message, and finally a test byte w11. Each byte is located in a separate storage cell of this storage position. The storage position B12 contains a plurality of bytes s12, q12, n12, l12 and further bytes, and a byte w12. The significance of these bytes corresponds to their labeling. By means of an address counter C1 and a decoder D1 the various storage cells are operated and bytes are forwarded. The bytes which form the various items of information are forwarded in an interleaved fashion because of the TDM operation. Accordingly, the various synchronization bytes s11, s12 . . . etc., are forwarded first, followed by the various acknowledgment bytes q11, q12 . . . etc, followed by the various number of bytes n11, n12 . . . etc, until finally the various test bytes w11, w12 . . . etc, are forwarded. If it proves expedient, the various bytes can also be combined in accordance with their supply in storage positions. Here, the number of bytes are supplied to the buffer store B11–B1x from a number generator n1, whereas the other bytes are supplied by the control unit P1. The supply takes place by way of two AND gates which are then additionall operated as suitable periods of time by the decoder D1 in order that the awaiting bytes can be received by the buffer store B11–B1x at these times. Bytes belonging to new items of information (next items to be transmitted) can be input in arbitrary forwarding intervals.

Because of the TDM operation, the various bytes already contained in the buffer store are repeatedly transmitted to the receiving device EP2 by way of the parallel/series converter P/S and the multiplexer M1. Between the forwarding of the bytes n11 and n12 into the storage position B11, it is possible, for example, to input a new item of information. This results in the fact that during the forwarding cycle currently being run for the bytes s11–w11, first the bytes s11, q11 and n11 of the previous item of information and then the bytes l11 and w11 of the new item of information are forwarded. Therefore, the buffer store B21–B2x to which these bytes are transmitted does not supply new items of information arriving therein until the completion of a full recording cycle. This ensures that the storage position B21 to which, for example, the bytes forming a new item of information have been transmitted, only contains bytes which form part of a new item of information.

The multiplexers M1 and M2 are operated in synchronism. For this purpose, they are each connected to the associated address counter, so that the multiplexer M1 is connected to the address counter C1 of the transmitting device SP1 and the multiplexer M2 is connected to the address counter C2 of the receiving device EP2. Synchronism is also assured by means of the synchronizing signals s11, etc. This results in the fact that the items of information contained in a storage cell of a storage position of the buffer store B11–B1x are each fed to the corresponding storage cell of the corresponding storage position of the buffer store B21–B2x of the receiving device EP2. The bytes which are supplied by the multiplexers (not shown here) of the other devices can be transmitted via TDM channels which are interposed with a time utilization ratio between the TDM channels which are commonly used for the devices SP1 and EP2. Here, again, the regular cyclic operation of buffer stores is used for the byte-wise transmission of items of information which have themselves first been input byte-wise into storage cells of a buffer store. This regular cyclic operation also takes place when items of information are transmitted in which the number of associated bytes is smaller than the maximum number which depends upon the number of storage cells which form a storage position.

In the receiving device EP2, the associated buffer store B21–B2x is operated with the aid of the address counter C2 and the decoder D2. A byte which has arrived and has been supplied by the associated series/parallel converter S/P is in each case compared with the corresponding byte already contained in the buffer store by means of a comparator U2. In the event of inequality, the comparator U2 supplies a signal to an AND gate which precedes the buffer store B21–B2x and therefore causes the byte which has arrived to be forwarded via this AND gate to the buffer store and stored therein. In addition, the signal supplied by the comparator U2 is fed to a time T2 from where, at the end of a full recording cycle, it is fed to an AND gate connected to the output of the buffer store B21–B2x. Then, bytes which form part of a newly arrived item of information can be supplied by the buffer store B21–B2x during a recording interval. These items of information are fed to the control unit P2.

In the exemplary embodiment of the process of the present invention which has been explained above with reference to FIG. 2, a plurality of items of information each consisting of a plurality of bytes s11-w11, s12-w12, etc are input into the buffer store B11-B1x of the transmitting device SP1. Therefore, these bytes are contained therein simultaneously. They are then transmitted either to the same device EP2 or to different devices. They are transmitted via a parallel/series converter P/S which follows the buffer store B11-B1x in the transmission path and via a following multiplexer M1. The multiplexer M1 distributes the items of information between various TDM channels which extend to the receiving devices, such as the TDM channel k11, k12. In the receiving device EP2 the items of information are received by way of a multiplexer M2 which precedes an associated buffer store B21-B2x and via a series/parallel converter S/P. The multiplexer M2 forwards the information in the TDM channels consecutively to the assigned storage cells of the buffer store B21-B2x (also see the German patent application No. 28 34 918).

As already mentioned, acknowledgment bytes, such as the acknowledgment bytes q11 and q12 can also be inserted into the items of information which are transmitted. These acknowledgment bytes can acknowledgment correct reception of items of information which have been previously received via a further TDM channel which additionally connects the two participating devices. In the arrangement shown in FIG. 2, a TDM channel of this kind is represented, for example, by the TDM channel k21. This TDM channel k21 connects the transmitting device SP2 and the receiving device EP1. This TDM channel serves to transmit items of information composed of a plurality of bytes in a manner similar to that already described. These items of information are then fed to the control unit P1 which is operable to insert acknowledgement bytes into items of information which are transmitted from the device SP1 to the device EP2. From the device EP2, these acknowledgement bytes are then fed to the control unit P2. The control unit P2 therefore receives a confirmation that items of information which it has previously supplied have arrived correctly in the receiving device. Advantageously, an acknowledgement byte is formed with the aid of the number byte of the acknowledged information in the device which receives this information. If the acknowledgement byte contains this number byte, by comparing the acknowledgement byte with the number byte of the last item of information to have been transmitted in the received device it is possible to establish that this item of information has arrived correctly in the receiving device. For this purpose, a number generator N1 of the device SP1 is additionally connected to the comparator V1 in the control unit P1. The comparator V1 is also supplied with received acknowledgement bytes. The comparison may show that the transmission of the items of information provided with the number byte which was taken into account in the comparison process has correctly ended. The control unit P2 contains the comparator V2 which is employed accordingly. Advantageously, the relevant device can evaluate the reception of an acknowledgement byte as the signal that the TDM channel used to transmit the acknowledged information has been released to transmit a further item of information. Therefore, for example, the acknowledgement byte q11 can be used in the receiving device EP2 and in the associated control unit P2 to establish that an item of information which was previously transmitted across the TDM channel k21 has arrived correctly and that now the TDM multiplex channel k21 has been released to transmit the next item of information. The repeated transmission of the acknowledged information is interrupted.

In the receiving device, the correct reception of an item of information composed of a plurality of bytes can be established by means of the test byte. Advantageously, in the exemplary embodiment described herein, the test byte is formed from the length byte and the following bytes of the item to be transmitted in the transmitting device. In the receiving device, a test byte is formed similarly and is compared with the received test byte. In the event of conformity, it can be assumed that the transmitted item of information has been received correctly. Moreover, it is also possible to check whether the contents of the items of information can really be transmitted by the transmitting device. If this is not so, it can be concluded that a fault has occurred.

A control unit which finally supplies the items of information which are to be transmitted forms part of a telephone exchange system in the described examples. The control device which controls the operating sequence of the control unit can obtain the items of information which are to be transmitted in accordance with this operating rhythm from storage positions of a working memory and forward these to the buffer store of the transmitting device (see German patent application No. 28 34 918). In a control unit which items of information are finally transmitted, the items of information contained in the buffer store of the receiving device can be obtained from the control device for further processing in accordance with the operating rhythm (see German patent application No. 28 34 916). In a telephone exchange system of this kind, the TDM channels which serve to connect the various devices also include those which are used for the transmission of conversations for which purpose PCM technology can be used.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A process for transmitting items of information between devices of an indirectly controlled exchange system via time division multiplex channels with multiple repetition of the items, in particular for a telephone exchange system equipped with time channel couplers, comprising the steps of:

in a transmitting device, forming items of information each comprising a plurality of bytes including a number byte which identifies the relevant item of information;

storing each item byte-wise into storage cells of a buffer store and outputting the items byte-wise in a regular cyclic operation;

transmitting the items of information from the transmitting device to a receiving device;

receiving the items of information in the receiving device;

storing received items of information in a buffer store on the basis that bytes belonging to new items of information are stored only once; and outputting the new items of information after a complete recording cycle.

2. The method of claim 1, wherein the step of storing received bytes is further defined as:

comparing each received byte with the corresponding previously received byte; and in the event of inequality storing the new byte in place of the previously received byte.

3. The method of claim 2, comprising the further step of:

supplying stored items of information from the receiving device buffer store during the recording interval.

4. The method of claim 2, wherein:

said step of storing items in the transmitting device is further defined as storing the bits forming a byte in parallel and outputting the bits in parallel;

said step of storing bytes in the receiving device is further defined as storing the bits forming a byte in parallel and outputting the bits in parallel;

said steps of transmitting and receiving the items of information are further defined as transmitting and receiving the bits in series;

and comprising the further steps of:

converting the parallel bits into series for transmission; and converting the serially received bits into parallel for storage.

5. The method of claim 4, wherein the step of transmitting and receiving are further defined as:

interlacingly demultiplexing the bits over a plurality of time division multiplex channels; and multiplexing the received bits to remove the interlace upon storage.

6. The method of claim 5, wherein the step of forming items of information is further defined as forming each item to include an acknowledgement byte including information representing the respective number byte, and comprising the further steps of:

transmitting the acknowledgement byte from the receiving device to the transmitting device over a separate time division multiplex channel;

receiving the acknowledgement byte at the transmitting device; and in the transmitting device, comparing the acknowledgement byte with the respective number byte to determine correct reception of the respective item by the receiving device.

7. The method of claim 6, comprising the further step of:

in the receiving device, evaluating the receipt of the acknowledgement byte as a signal that the separate time division multiplex channel is released to transmit another acknowledgement byte.

8. The method of claim 7, wherein the items of information to be transmitted are supplied by a rhythmic operated control unit of a telephone exchange system which stores the items in a working memory, and the step of forming items of information is further defined as:

feeding the items of information from the working memory to the buffer store at the operating rhythm of the system; and operating a counter to generate to insert the respective number byte in each item of information.

9. The method of claim 8, wherein the receiving device includes a control unit and said step of outputting items of information is further defined as:

feeding the items of information to the last-mentioned control unit for further processing.

* * * * *